(12) United States Patent
Abe

(10) Patent No.: US 7,649,669 B2
(45) Date of Patent: Jan. 19, 2010

(54) DISPLAY DEVICE

(75) Inventor: Daisuke Abe, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/953,367

(22) Filed: Dec. 10, 2007

(65) Prior Publication Data

US 2008/0137168 A1    Jun. 12, 2008

(30) Foreign Application Priority Data

Dec. 12, 2006    (JP)    ............... 2006-334726

(51) Int. Cl.
    *G02F 1/153*    (2006.01)
(52) U.S. Cl. ...................... 359/273; 359/242
(58) Field of Classification Search .................. 359/273
    See application file for complete search history.

(56) References Cited

U.S. PATENT DOCUMENTS

| 6,778,312 | B2* | 8/2004 | Kawai ................ 359/266 |
| 6,798,472 | B2 | 9/2004 | Nagae |
| 2003/0184692 | A1 | 10/2003 | Nagae |
| 2005/0270619 | A1 | 12/2005 | Johnson et al. |
| 2006/0285195 | A1* | 12/2006 | Moriyama et al. ......... 359/296 |

FOREIGN PATENT DOCUMENTS

| JP | A-62-153825 | 7/1987 |
| JP | A-64-007560 | 1/1989 |
| JP | A-2003-280042 | 10/2003 |
| JP | A-2003-315840 | 11/2003 |
| JP | A-2005-534078 | 11/2005 |
| JP | A-2006-106669 | 4/2006 |

OTHER PUBLICATIONS

Goh et al., "A New Color Electronic Paper with Organic Electrochromic Technology," Proceedings of the 12th International Display Workshops in conjunction with Asia Display 2005, 2005, p. 895-898.

* cited by examiner

*Primary Examiner*—Jordan M. Schwartz
*Assistant Examiner*—James C Jones
(74) *Attorney, Agent, or Firm*—Oliff & Berridge, PLC (57) ABSTRACT

A display device including a color filter having a multiple types of electrochromic dyes disposed on a pixel by pixel basis, the electrochromic dyes allowing reversible coloring or decoloring, and a light quantity control element for controlling an amount of light emitted to the electrochromatic dyes of the color filter.

13 Claims, 5 Drawing Sheets

DISPLAY DEVICE

The entire disclosure of Japanese Patent Application No. 2006-334726, filed Dec. 12, 2006 is expressly incorporated by reference herein.

BACKGROUND

1. Technical Field

The present invention relates to a display device.

2. Related Art

Electrochromism is a phenomenon of reversible change in color resulting from electric-field oxidation or reduction reaction, which reversibly occurs upon application of a voltage. Such an electrochromic display device has been studied, that utilizes an electrochromic compound exhibiting coloring or/and decoloring characteristics that cause the aforementioned phenomenon. JP-A-2006-106669 is an example of related art.

The electrochromic device, however, disadvantageously has a narrow expressible tonal range of brightness. Another problem is the inability to express a perfect black.

SUMMARY

An advantage of the present invention is to provide a new type of color display device exhibiting good display properties.

According to an aspect of the invention, a display device includes a color filter having a multiple types of electrochromic dyes disposed on a pixel by pixel basis, the electrochromic dyes allowing reversible coloring or decoloring, and a light quantity control element for controlling an amount of light emitted to each of the electrochromic dyes of the color filter.

In this manner, formation of the light quantity control element for controlling the quantity of light emitted to the color filter having the electrochromic dyes enables display of a desired color by mixing the multiple types of electrochromic dyes as well as control of brightness of the light.

In this case, the color filter may have the multiple types of electrochromic dyes arranged in, a plane correspondingly to a single pixel, resulting in a color display device being achieved. All of the electrochromic dyes inside the single pixel are made colorless by being decolorized such that the light emitted from a side of the light quantity control element is not absorbed and white display is realized. Therefore, the color filter enables display of brighter white compared with the known color filter with RGB (red, green, blue) sub-pixels.

It is more preferable that the color filter have the multiple types of electrochromic dyes disposed in a laminated manner correspondingly to a single pixel. For example, it is preferable that the three types of electrochromic dyes developing cyan, magenta, and yellow, respectively, be disposed in a laminated manner. Accordingly, the electrochromic dyes developing cyan, magenta, and yellow, respectively, can be laminated inside the single pixel without dividing the single pixel into RGB sub-pixels, for example. The electrochromic dyes other than those necessary for display of a desired color are made transparent and colorless, thereby not absorbing the light. Therefore, the use efficiency of the light emitted from the light quantity control device can be improved.

The color filter may further have two transparent electrodes opposing to each other in a manner to have the electrochromic dyes intervened therebetween. A voltage applied between the two electrodes makes it possible to control coloring and decoloring of the electrochromic dyes.

Alternatively, the color filter may further have two transparent electrodes opposing to each other in a manner to have a laminated body of the electrochromic dyes having been disposed in a laminated manner, intervened between the two transparent electrodes. Coloring or decoloring of each of the electrochromic dyes in the laminated body is controlled only by controlling a voltage applied between the two electrodes, which simplifies a structure.

Alternatively, each of the electrochromic dyes disposed in a laminated manner may be intervened between two transparent electrodes.

According to another aspect of the invention, a display device includes a first substrate, a second substrate, an electrophoretic layer positioned between the first substrate and the second substrate, and an electrochromic layer positioned between the second substrate and the electrophoretic layer. In this manner, a hue on display of the electrochromic layer and a hue on display of the electrophoretic layer can be utilized. The electrophoretic layer includes electrochromic material and may be set to a single layer or multiple layers.

In the display device described above, it is preferable that a first electrode be formed between the first substrate and the electrophoretic layer, that a second electrode be formed between the electrophoretic layer and the electrochromic layer, and that a third electrode be formed between the electrochromic layer and the second substrate. In this manner, the electrophoretic layer and the electrochromic layer can be controlled independently from each other.

In this display device, it is preferable that a hue of the electrochromic layer be displayed when an electronic field is applied between the second electrode and the third electrode, and that a hue of the electrophoretic layer be displayed when the electronic field is not applied between the second electrode and the third electrode. In this manner, the hue of the electrophoretic layer can be displayed by making the electrochromic layer transparent.

In this display device, it is preferable that the electrophoretic layer include a white charged particle, and that the display device be controlled such that the white charged particle is positioned at a side adjacent to the second substrate in the electrophoretic layer when the electronic field is applied between the second electrode and the third electrode. As the white charged particle, a titanium oxide particle or the like may be used.

In this display device, it is preferable that the electrophoretic layer include a black charged particle. In this manner, a black color, which cannot be expressed by subtractive color mixing, can be displayed. As the black charged particle, a carbon black particle may be used.

In this display device, it is preferable that the electrochromic layer display a plurality of hues, and that the electrophoretic layer display a hue other than the plurality of hues. In this manner, it is possible to increase the number of hues displayed in the same display region.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments of the present invention will be described with reference to drawings.

Figure 1:
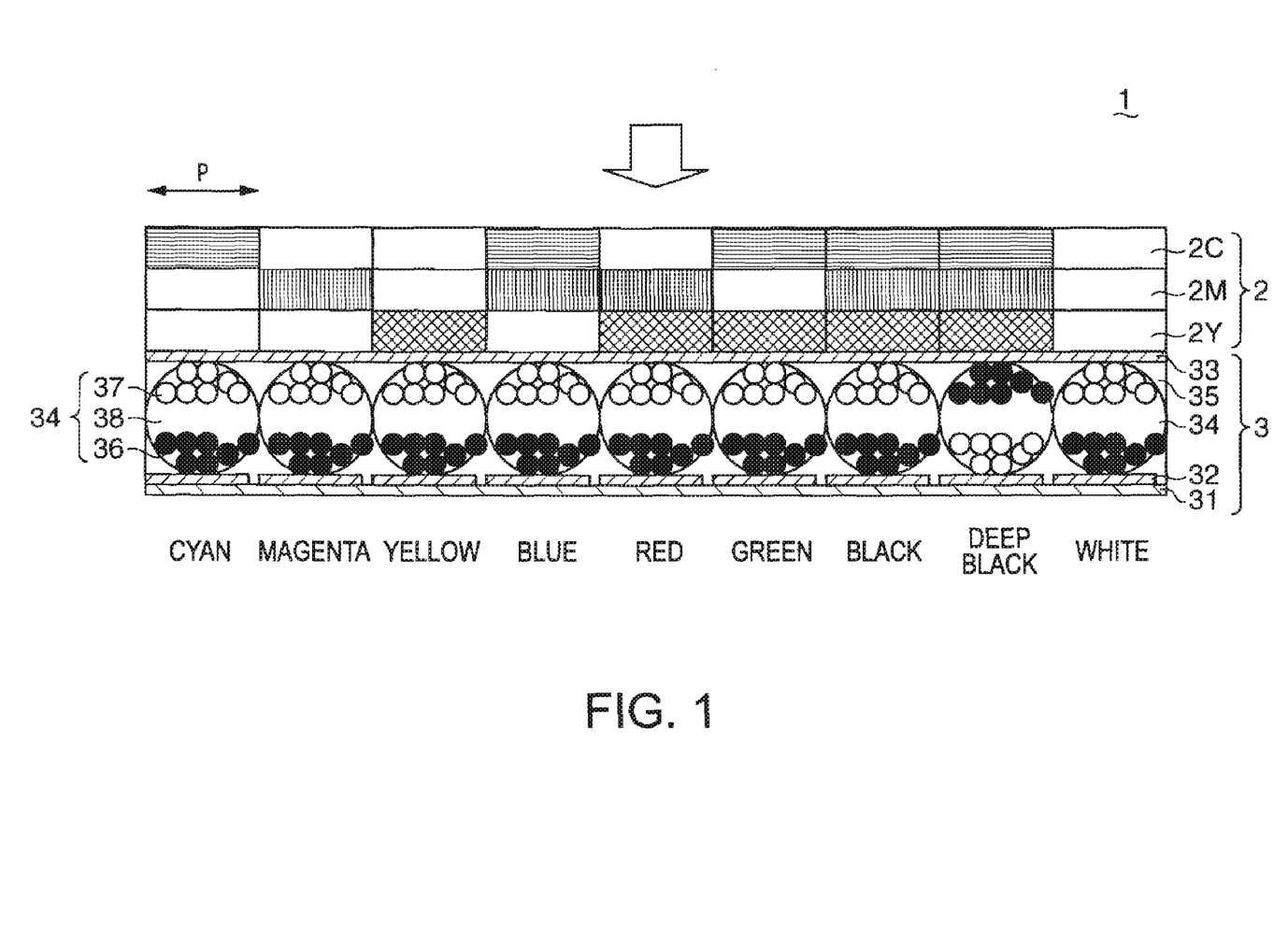
FIG. 1 is a schematic configuration diagram of a display device according to a first embodiment.

FIG. 1 is a cross-sectional view of a reflective display device according to a first embodiment.

As shown in FIG. 1, a display device 1 according to this embodiment is structured by laminating a color filter 2 and a light quantity control element 3.

The color filter 2 has a multiple types of layers of electrochromic (EC) dyes referred to as electrochromic layers. Each of the layers is disposed on a pixel P by pixel P basis and exhibits reversibly coloring or decoloring characteristics. In this embodiment, the single pixel P is provided therein with the electrochromic dye developing cyan, i.e., a cyan EC dye 2C, the electrochromic dye developing magenta, i.e., a magenta EC dye 2M, and the electrochromic dye developing yellow, i.e., a yellow EC dye 2Y, which are placed in a laminated manner.

An electrochromic material exhibits reversible coloring or decoloring characteristics with the aid of an applied voltage. This phenomenon of reversible change in color results from oxidation reaction or reduction reaction of the material, which is caused by application of a voltage. In FIG. 1, the EC dyes 2C, 2M, and 2Y in a colored state are subject to a hatching process while the EC dyes 2C, 2M, and 2Y in a decolorized state are not subject to the hatching process.

A case of laminating three layers of EC dyes requires subtractive color mixing for a coloring process. Therefore, three primary colors of the subtractive color mixing, that is, cyan, magenta, and yellow are preferably used in this embodiment. In order to express a more perfect black, the color filter 2 may be composed of four layers of the EC dyes of cyan, magenta, yellow, and black.

There is no limitation as to material developing each of cyan, magenta, and yellow but such a material as described in the document, Proceeding of the 12$^{th}$ International Display Workshops in conjunction with Asia Display 2005 p. 895 (2005), may be used. For example, used as the cyan EC dye 2C is heptyl viologen (HV) 1,4-diacetylbenzene (DAB). Used as the magenta EC dye 2M is dimethyl terephthalate. Used as the yellow EC dye 2Y is 4,4-Biphenylcarboxylic acid.

The light quantity control element 3 controls the quantity of light emitted to a laminated body of the EC dyes 2C, 2M, and 2Y. Described in this embodiment is a case where the light quantity control element 3 controls the quantity of light emitted to the color filter 2 by reflecting outside light.

The light quantity control element 3 has a display electrode 32 formed on a first substrate 31 made of glass or the like, a counter electrode 33 disposed opposite to the display electrode 32, and a display medium disposed between the display electrode 32 and the counter electrode 33. A transparent electrode such as indium tin oxide (ITO) can be used as the display electrode 32 and the counter electrode 33. A common electrode shared by the plurality of pixels can be used as the counter electrode 33.

This embodiment exemplifies an electrophoretic layer positioned between the display electrode 32 and the counter electrode 33 as a display medium. Herein, the electrophoretic layer contains microcapsules 34. Each of the microcapsules 34 is secured with a binder 35. Each of the microcapsules 34 internally contains black particles 36, white particles 37, and a transparent dispersion medium 38. For example, the black particles 36 are negatively charged while the white particles 37 are positively charged.

Other than the electrophoretic layer, a twist ball or a liquid crystal may be used as the display medium. There is no limitation as to type of the liquid crystal, so that a polymer-dispersed liquid crystal, a polymer network liquid crystal, a monomer cholesteric layer, and the like may be used.

Figure 2:
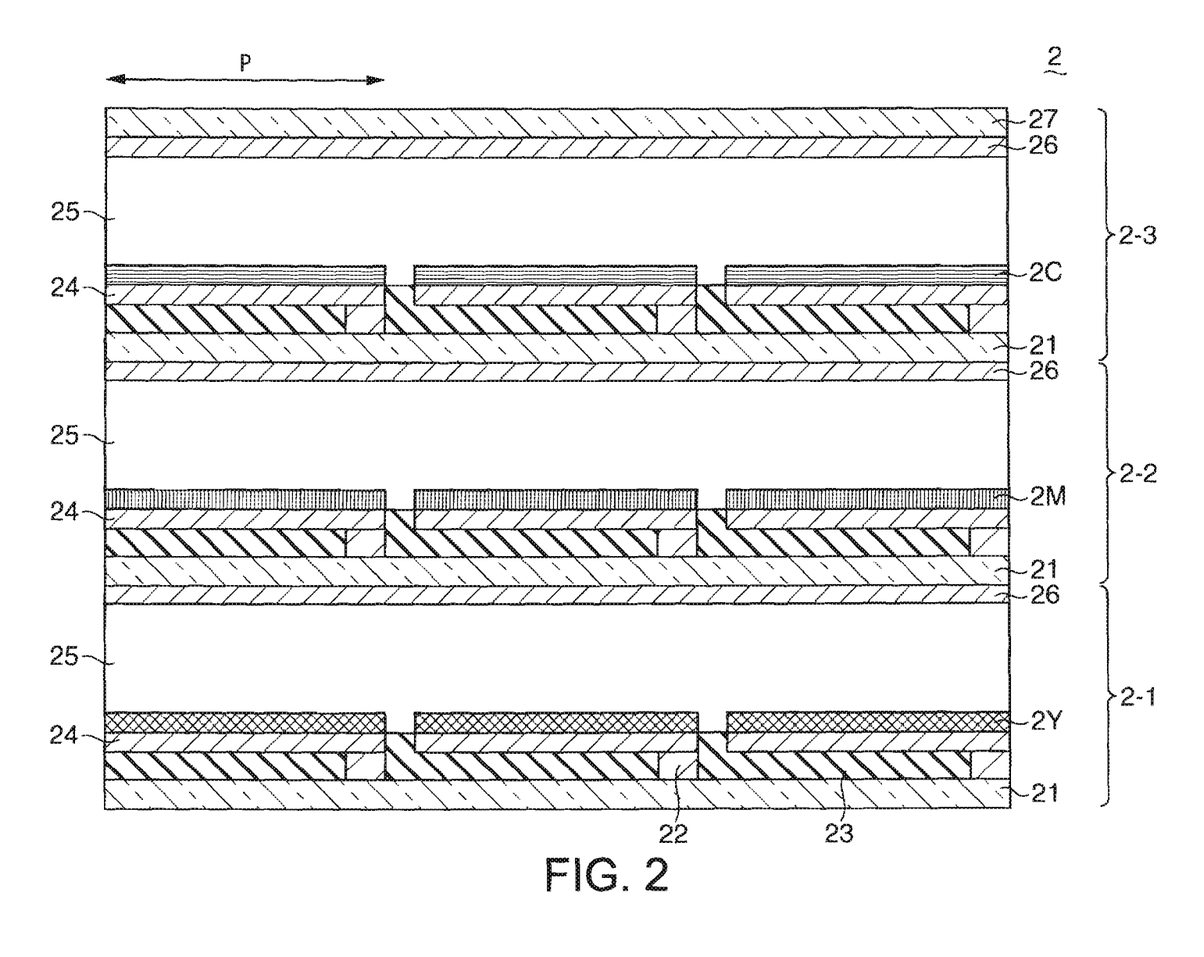
FIG. 2 is a cross-sectional view of a color filter.

FIG. 2 is a cross-sectional view of one example of the color filter.

As shown in FIG. 2, the color filter 2 is formed by laminating three color filter substrates, that is, a color filter substrate 2-1 for yellow, a color filter substrate 2-2 for magenta, and a color filter substrate 2-3 for cyan.

Each of the color filter substrates 2-1, 2-2, 2-3 has a transparent substrate 21 made of glass or the like, a thin-film transistor 22 and an interlayer film 23 both formed on the transparent substrate 21, a display electrode 24 formed on the thin-film transistor 22 and the interlayer film 23, the EC dye 2Y, 2M, or 2C formed on the display electrode 24, and a counter electrode 25 disposed on the EC dye with an electrolyte intervened. The display electrode 24 and the counter electrode 26 are each composed of a transparent electrode such as ITO. The counter electrode 26 is common to all pixels and the display electrode 24 is divided on a pixel P basis. The color filter 2-3 as the topmost layer is provided with a counter substrate 27 as a second substrate made of glass or the like on a top surface of the counter electrode 26.

In this embodiment, each of the AE dyes 2C, 2M, and 2Y is intervened between the display electrode 24 and the counter electrode 26, which facilitates control of coloring or decoloring of each of the EC dyes 2C, 2M, and 2Y.

Next, operation of the display device according to this embodiment is explained.

As shown in FIG. 1, where a voltage of 0V is applied to the counter electrode 33 and a positive voltage is applied to the display electrode 32, the negatively-charged black particles 36 inside the microcapsules 34 are gathered at a side adjacent to the display electrode 32 while the positively-charged white particles 37 are gathered at a side adjacent to the counter electrode 33. As a result, outside light, which is taken in a direction of an arrow in FIG. 1, is reflected by the white particles 37, resulting in a white display.

On the other hand, where a voltage of 0V is applied to the counter electrode 33 and a negative voltage is applied to the display electrode 32, the negatively-charged black particles 36 inside the microcapsules 34 are gathered at the side adjacent to the counter electrode 33 while the positively-charged white particles 37 are gathered at the side adjacent to the display electrode 32. As a result, the outside light, which is taken in a direction of the arrow in FIG. 1, is absorbed in the black particles 36, resulting in a black display.

As described above, the light quantity control element 3 controls the quantity of outside light reflected to a side adjacent to the color filter 2, that is, the quantity of light emitted to the color filter 2. For example, a dispersion degree of the black particles 36 and the white particles 37 can be changed by changing a pulse voltage width to be applied to the display electrode 32 and the counter electrode 33, thereby achieving tonal expression of brightness.

Coloring or decoloring of each of the EC dyes 2C, 2M, and 2Y can be controlled by controlling a voltage applied between the electrodes 24, 26 through which each of the EC dyes 2C, 2M, and 2Y is intervened. For example, application of a voltage exceeding a coloring threshold value causes coloring of the EC dye. Each of the EC dyes has a different coloring threshold value. The EC dye in a colored state is led into a decolorized state upon reception of application of a voltage exceeding a decoloring threshold value, i.e., a reverse voltage of a voltage necessary for coloring. In this manner, coloring or decoloring of each of the EC dyes $2C$, $2M$, and $2Y$ inside the pixel P can be controlled. White light reflected by the light quantity control element 3 is transmitted through the color filter 2, thereby being colored in a desired color by the subtractive color mixing with the EC dyes $2C$, $2M$, and $2Y$.

In explanation using the pixel P at a left side of FIG. 1, coloring of only the cyan EC dye $2C$ results in a cyan display. Coloring of only the magenta EC dye $2M$ results in a magenta display. Coloring of only the yellow EC dye results in a yellow display.

Furthermore, the cyan EC dye $2C$ and the magenta EC dye $2M$ both in a colored state result in a blue display because of color mixture of these dyes. The magenta EC dye $2M$ and the yellow EC dye $2Y$ both in a colored state result in a red display because of color mixture of these dyes. The cyan EC dye $2C$ and the yellow EC dye $2Y$ both in a colored state result in a green display because of color mixture of these dyes.

Furthermore, the EC dyes $2C$, $2M$, $2Y$ all in a colored state result in a black display because of color mixture of these dyes. In fact, this color mixture of the EC dyes $2C$, $2M$, and $2Y$, however, cannot achieve such a perfect black color as required for the display device. This is because cyan absorbs only red in a visible light range but actually has absorption spectrum with a Gaussian profile, in which a peak appears around red. This applies to the other colors. The light is reduced according to a product of transmission spectra ((1−absorption)×100%) of the laminated layers in the subtraction color mixing, so that either one of the laminated layers has to absorb 100% of light with all wavelengths in a visible light range, that is, to achieve transmission of 0%, in order to set the transmitted light to zero for the realization of a perfect black. In the case of the absorption spectrum with a step function, transmission of 0% can be achieved in all wavelength regions. However, the perfect black is actually not achievable due to a Gaussian profile of the absorption spectrum.

In addition to color mixture of the EC dyes $2C$, $2M$, and $2Y$, the substantially perfect black can be achieved by displaying black at the side of the light quantity control element 3 in this embodiment. The substantially perfect black also can be achieved by displaying black at the side of the light quantity control element 3 after making the EC dyes $2C$, $2M$, and $2Y$ in a decolorized state. A white display is achieved by making all of the EC dyes $2C$, $2M$, and $2Y$ in a pixel in a decolorized state as well as displaying white at the side of the light quantity control device 2.

As described above, the electrochromic material is used as the color filter 2 while the light quantity control element 3 for controlling the quantity of light emitted to the color filter is independently formed, thereby eliminating the disadvantage of the electrochromic material such as a narrow expressible tonal range.

Formation of the color filter 2 with use of electrochromic dyes enables lamination of cyan EC dye $2C$, the magenta EC dye $2M$, and the yellow EC dye $2Y$ inside the single pixel P without necessity of dividing one pixel into red, green, and blue (RGB) sub-pixels or the like. The EC dyes other than that necessary for display of the desired color are made colorless, thereby not absorbing light. It is therefore possible to improve the light use efficiency than before.

In other words, where the single pixel is composed of three sub-pixels of red, green, and blue by disposing dyes made from RGB pigments or colorants in a plane, the green and blue sub-pixels are used for black display, so that the light use efficiency is reduced to one-third. In this point, this embodiment does not require division into sub-pixels, thereby being able to improve the light use efficiency. Thus, such a reflective display device can be obtained, as improves the use efficiency of outside light and achieves a bright display.

Display of the perfect black is difficult by the subtractive color mixing with use of the EC dyes but can be achieved with the light quantity control element 3 which controls the black display. There is no need for sub-pixel division, which permits upsizing of elements of the thin-film transistor 22 disposed inside the pixel in the case of setting the same pixel size as before.

Second Embodiment

Figure 3:
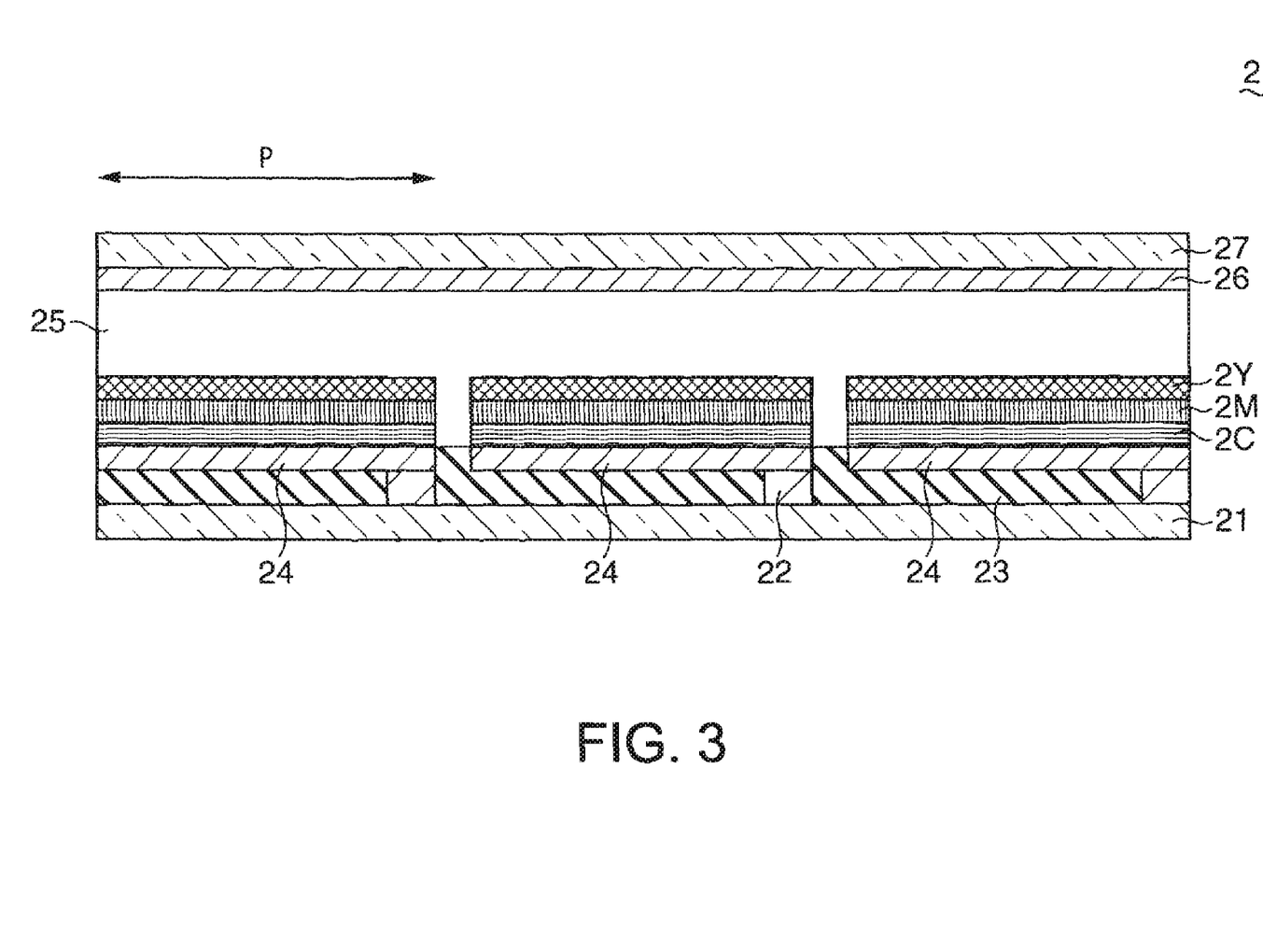
FIG. 3 is a cross-sectional view of a color filter of a display device according to a second embodiment.

FIG. 3 is a schematic cross-sectional view of the color film 2 of a display device according to a second embodiment. Explained in the second embodiment is a case where the laminated body of the EC dyes $2C$, $2M$, and $2Y$ is intervened between the display electrode 24 and the counter electrode 26.

The color filter 2 has the transparent substrate 21 made of glass or the like, the thin-film transistor 22 and the interlayer film 23 both formed on the transparent substrate 21, the display electrode 24 formed on the thin-film transistor 22 and the interlayer film 23, the EC dyes $2C$, $2M$, and $2Y$, the counter electrode 26 disposed on the laminated body of the EC dyes with the electrolyte intervened, and a counter electrode 27 made of grass or the like formed on the counter electrode 26. The counter electrode 24 is common to all pixels and the display electrode 24 is divided on a pixel basis.

The second embodiment requires selection of the EC dyes $2C$, $2M$, and $2Y$ that satisfy a following relation of the coloring threshold characteristics as well as control of color development.

For example, on the condition that the cyan EC dye $2C$, the magenta EC dye $2M$, and the yellow EC dye $2Y$ are set to have the coloring threshold voltage of $Vc1$, $Vm1$, and $Vy1$, and the decoloring threshold voltage of $Vc2$, $Vm2$, and $Vy2$, respectively, it is required that $Vc1$, $Vm1$, and $Vy1$ correspond to $Vc2$, $Vm2$, and $Vy2$ in the order of magnitude of absolute value. For example, the positive coloring threshold voltage leads to the negative decoloring threshold voltage. The case of $Vc1>Vm1>Vy1$ leads to $|Vc2|>|Vm2|>|Vy2|$.

In this case, application of the positive voltage V satisfying $V \geq Vc1$ leads the EC dyes $2C$, $2M$, and $2Y$ all into a colored state. Next, application of the negative voltage V satisfying $|Vc2|>|V| \geq |Vm2|$ leads only the magenta EC dye $2M$ and the yellow EC dye $2Y$ into a decolorized state. Therefore, only the cyan EC dye $2C$ can be selectively made in a colored state. Furthermore, application of the voltage V satisfying $Vc1>V \geq Vm1$ leads only the magenta EC dye $2M$ and the yellow EC dye $2Y$ into a colored state. Next, the negative voltage satisfying $|Vm2|>|V| \geq |Vy2|$ leads only the yellow EC dye $2Y$ into a decolorized state. Thus, only the magenta EC dye $2M$ can be selectively made in a colored state. Yet further, the voltage satisfying $Vm1>V \geq Vy1$ leads only the yellow EC dye $2Y$ into a colored state. In this manner, all color development combinations of the EC dyes $2C$, $2M$, and $2Y$ can be achieved.

According to the second embodiment, the material of EC dyes is more limited and the color development control gets more completed compared with those of the first embodiment. However, the second embodiment advantageously enables the color filter 2 to be thinned since the EC dyes 2C, 2M, and 2Y are laminated on the single transparent substrate 21.

Third Embodiment

Figure 4:
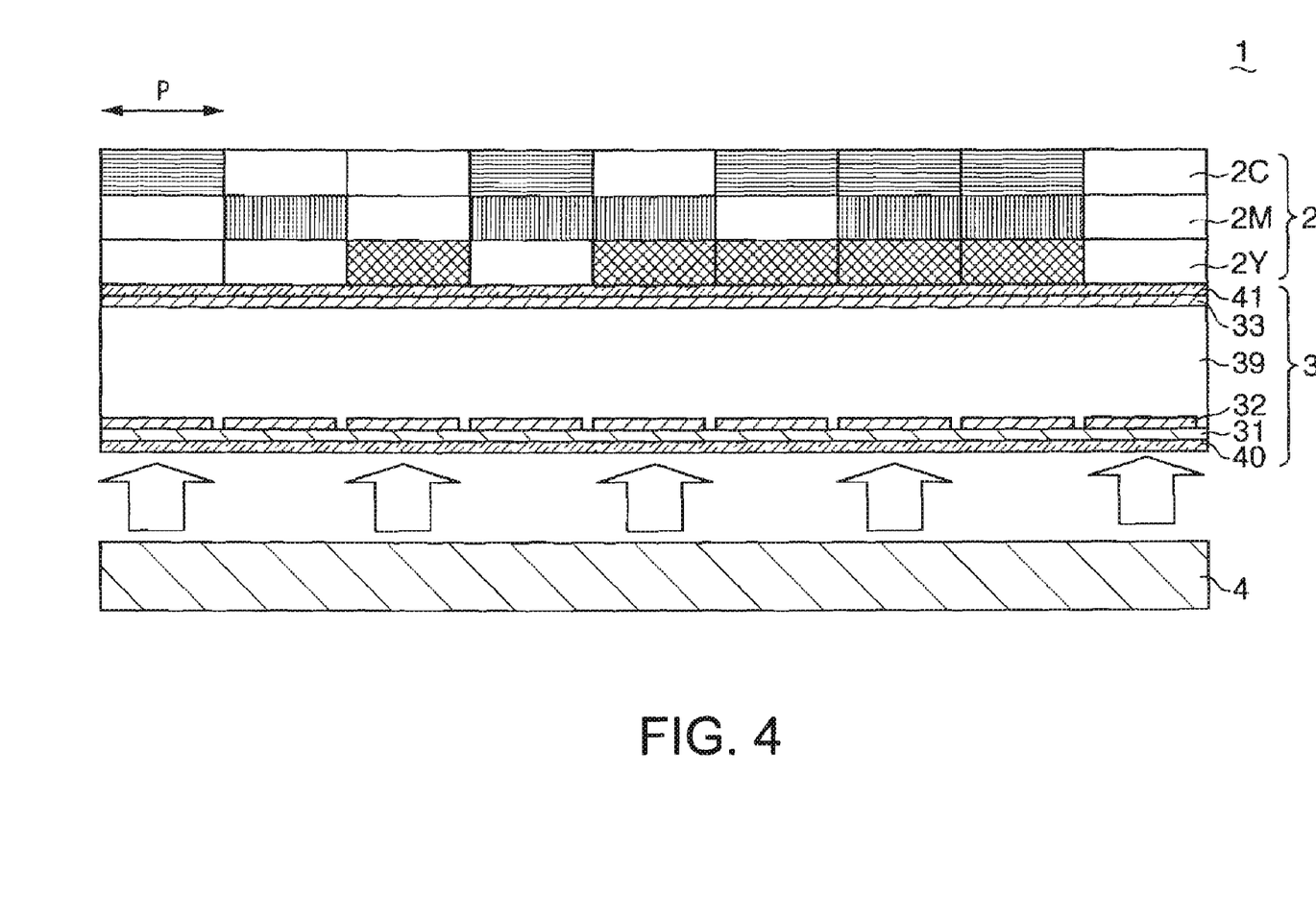
FIG. 4 is a schematic cross-sectional view of a display device according to a third embodiment.

FIG. 4 is a view showing a structure of a display device 1 according to a third embodiment. Examples of the reflective display device are explained in the first and second embodiments but an example of a transmissive display device is explained in this embodiment.

In this embodiment, the display device is formed by laminating the color filter 2, the light quantity control element 3, and a backlight 4 serving as a light source. A structure of the color filter 2 is the same as that of the first embodiment, so that corresponding explanation is omitted. The backlight 4 emits write light to the light quantity control element 3.

The light quantity control element 3 controls the quantity of light emitted to the laminated body of the EC dyes 2C, 2M, and 2Y. In this embodiment, the light quantity control element 3 controls the quantity of transmitted light which is emitted from the backlight 4. Therefore, in this embodiment, a liquid crystal 39 is used as a display medium filled between the display electrode 32 and the counter electrode 33. A nematic liquid crystal, which is used for the normal transmissive liquid crystal display device, can be used as the liquid crystal 39, and there is no limitation as to types. It is not illustrated but a pair of deflection plates 40, and 41, between which the substrate 31 and the counter electrode 33 are intervened, is disposed outside the substrate 31 and the counter electrode 33.

The light emitted from the backlight 4 is transmitted through the deflection plate 40, thereby being converted into a desired linear polarized light. An orientation state of the liquid crystal 39 is controlled with the voltage applied into the display electrode 32 and the counter electrode 33. A direction of the polarized light is controlled by the orientation state of the liquid crystal 39, and the quantity of light transmitted through the other deflection plate 41 is controlled. In a manner similar to the first embodiment, the light having been transmitted through the light quantity control element 3 is colored by the color filter 2.

Likewise the third embodiment, this invention can be applied to the transmissive display device. In this case also, the light use efficiency of the backlight 4 can be improved, which enables saving of power consumption of the backlight 4 while achieving bright display. As a result, the display device realizes low power consumption.

Fourth Embodiment

Figure 5:
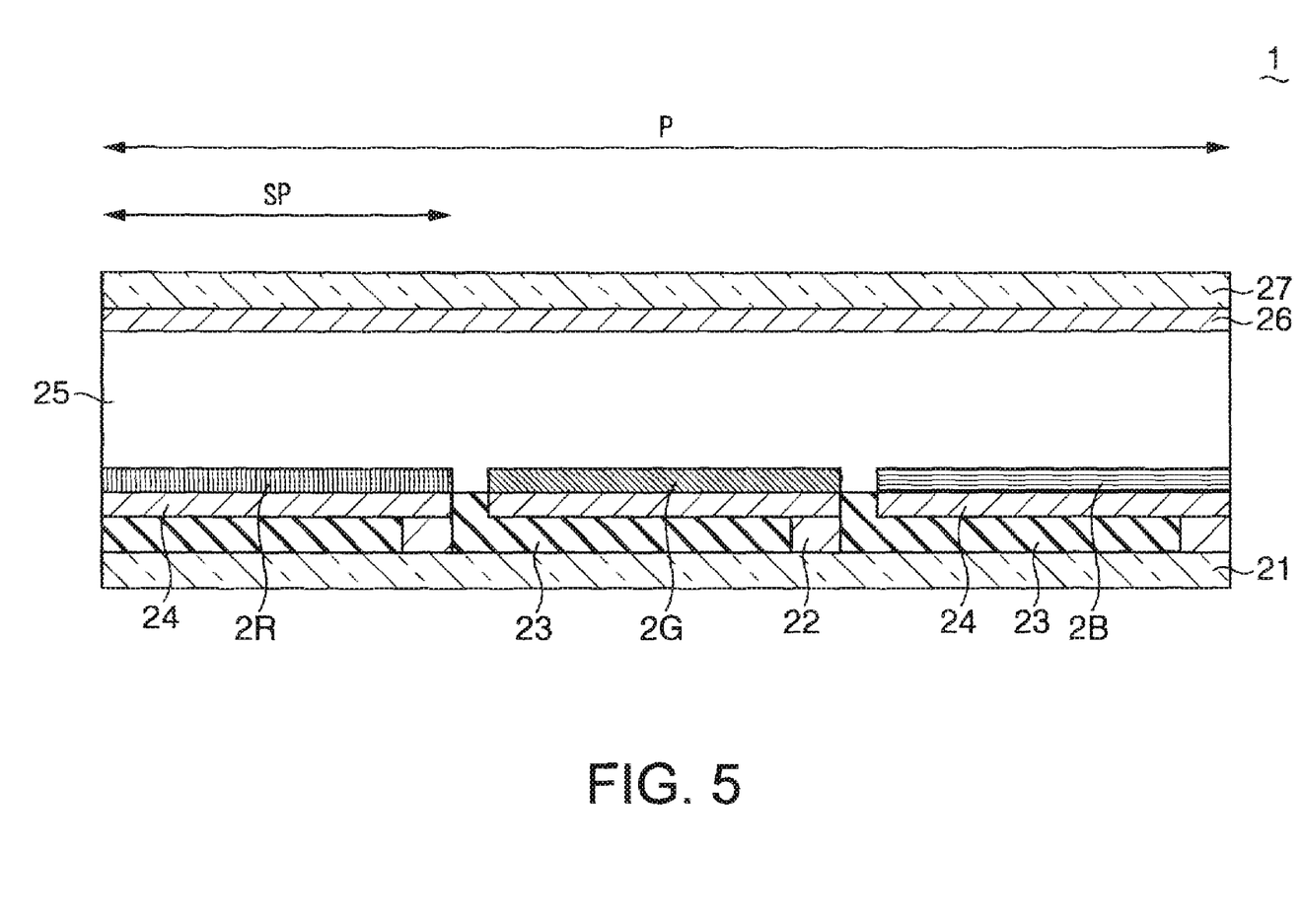
FIG. 5 is a schematic cross-sectional view of a display device according to a fourth embodiment.

FIG. 5 is a cross-sectional view of the color filter of a display device according to a fourth embodiment. Examples where the EC dyes are laminated inside the single pixel are explained in the first and second embodiments but an example where the EC dyes are disposed by being arranged in a plane inside the single pixel is explained in this embodiment. The same reference numerals are assigned to elements with the same structure as that of the first embodiment and the corresponding explanation is omitted.

FIG. 5 shows the cross-sectional view corresponding to a cross-sectional view of the single pixel P. The single pixel P is divided into three sub-pixels SP, in which each of the sub-pixels is provided with either one of layers of red EC dye 2R, green EC dye 2G, and blue EC dye 2B. The single pixel P is composed of the three sub-pixels respectively provided with the red EC dye 2R, the green EC dye 2G, and the blue EC dye 2B. The display electrode 24 is disposed on a sub-pixel SP-by sub-pixel SP basis, and coloring or decoloring of the red EC dye 2R, green EC dye 2G, and blue EC dye 2B is controllable.

Described in this embodiment is an example of coloring by additive color mixing. Thus, this embodiment preferably uses as the EC dye, a material bringing out the colors of R as red, G as green, and B as blue defined as three primary colors of the additive color mixing. There is no limitation as to material bringing out the colors of R, G, and B.

The color filter 2 controls coloring or decoloring of each of the EC dyes 2R, 2G, and 2B by controlling a voltage applied between the electrodes 24, and 26, between which the EC dyes 2R, 2G, 2B are intervened. For example, application of the voltage exceeding a coloring threshold value causes coloring of the EC dye. Each of the EC dyes has a different coloring threshold value. The EC dye in a colored state is led into a decolorized state upon reception of application of the voltage exceeding a decoloring threshold value, i.e., a reverse voltage of a voltage necessary for coloring. In a manner described above, coloring or decoloring of each of the EC dyes 2R, 2G, and 2B inside the pixel P is controlled. The white light emitted from the side of the light quantity control element 3 is transmitted through the color filter 2, thereby being colored in a desired color by the additive color mixing of the EC dyes 2R, 2G, and 2B.

Likewise the display device according to this embodiment, the single pixel may be composed of the three EC dyes 2R, 2G, and 2B by lining up in a plane the EC dyes of a single layer, each bringing out a different color. According to this embodiment, all of the EC dyes 2R, 2G, and 2Y are made colorless, which enables a white display by controlling light absorption. As a result, a black and white contrast can be improved compared with that of the known color filter using the pigments or colorants.

Furthermore, in the case of a red display, for example, red is displayed with the aid of the sub-pixel provided with the red EC dye 2R while the other EC dyes 2G, and 2B are made in a decolorized state, in which the light quantity control element 3 controls the light quantity with respect to the sub-pixels provided with the EC dyes 2G, and 2B. Therefore, red display can be achieved with different brightness in a range from a dark red to a pastel red.

This embodiment is not limited to the above described embodiments.

For example, the case where the color filter 2 and the light quantity control element 3 in this order from an observer are disposed is explained as one example of the reflective display device, but those may be disposed in the order of the light quantity control element 3 and the color filter 2 from the observer.

Other various modifications may be made without departing from the scope of the invention.

What is claimed is:

1. A display device, comprising:
a color filter having multiple types of electrochromic dyes disposed on a pixel by pixel basis, the electrochromic dyes allowing reversible coloring or decoloring; and
a light quantity control element for controlling an amount of light emitted to each of the electrochromic dyes of the color filter,
wherein the light quantity control element includes a first electrode divided on the pixel basis and a second electrode that is common to all pixels.

2. The display device according to claim 1, wherein the color filter has the multiple types of electrochromic dyes arranged in a plane correspondingly to a single pixel.

3. The display device according to claim 1, wherein the color filter has the multiple types of electrochromic dyes disposed in a laminated manner correspondingly to a single pixel.

4. The display device according to claim 3, wherein the multiple types of electrochromic dyes are three types of electrochromic dyes developing cyan, magenta, and yellow, respectively, and are disposed in a laminated manner.

5. The display device according to claim 2, wherein the color filter further has two transparent electrodes opposing to each other in a manner to have the electrochromic dyes intervened between the two transparent electrodes.

6. The display device according to claim 3, wherein the color filter further has two transparent electrodes opposing to each other in a manner to have a laminated body of the electrochromic dyes having been disposed in a laminated manner, intervened between the two transparent electrodes.

7. The display device according to claim 3, wherein each of the electrochromic dyes disposed in a laminated manner is intervened between two transparent electrodes.

8. A display device, comprising:
   a first substrate;
   a second substrate;
   an electrophoretic layer positioned between the first substrate and the second substrate;
   an electrochromic layer positioned between the second substrate and the electrophoretic layer;
   a first electrode formed between the first substrate and the electrophoretic layer, wherein the first electrode is not continuous along the electrophoretic layer; and
   a second electrode is formed between the electrophoretic layer and the electrochromic layer,
   wherein the first electrode is divided on a pixel basis and the second electrode is common to all pixels.

9. The display device according to claim 8, wherein:
   a third electrode is formed between the electrochromic layer and the second substrate.

10. The display device according to claim 9, wherein a hue of the electrochromic layer is displayed when an electronic field is applied between the second electrode and the third electrode, and wherein a hue of the electrophoretic layer is displayed when the electronic field is not applied between the second electrode and the third electrode.

11. The display device according to claim 9, wherein the electrophoretic layer includes a white charged particle, and wherein the display device is controlled such that the white charged particle is positioned at a side adjacent to the second substrate in the electrophoretic layer when the electronic field is applied between the second electrode and the third electrode.

12. The display device according to claim 8, wherein the electrophoretic layer includes a black charged particle.

13. The display device according to claim 8, wherein the electrochromic layer displays a plurality of hues, and the electrophoretic layer displays a hue other than the plurality of hues.

\* \* \* \* \*